No. 778,030. PATENTED DEC. 20, 1904.
M. GRAFFIUS.
NUT LOCK.
APPLICATION FILED AUG. 5, 1904.
NO MODEL.
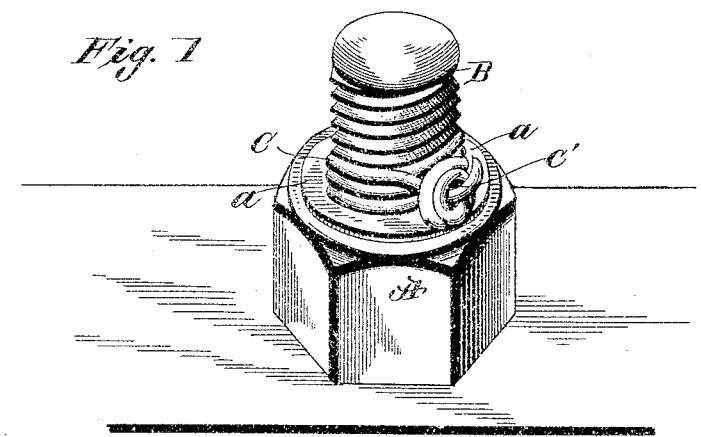
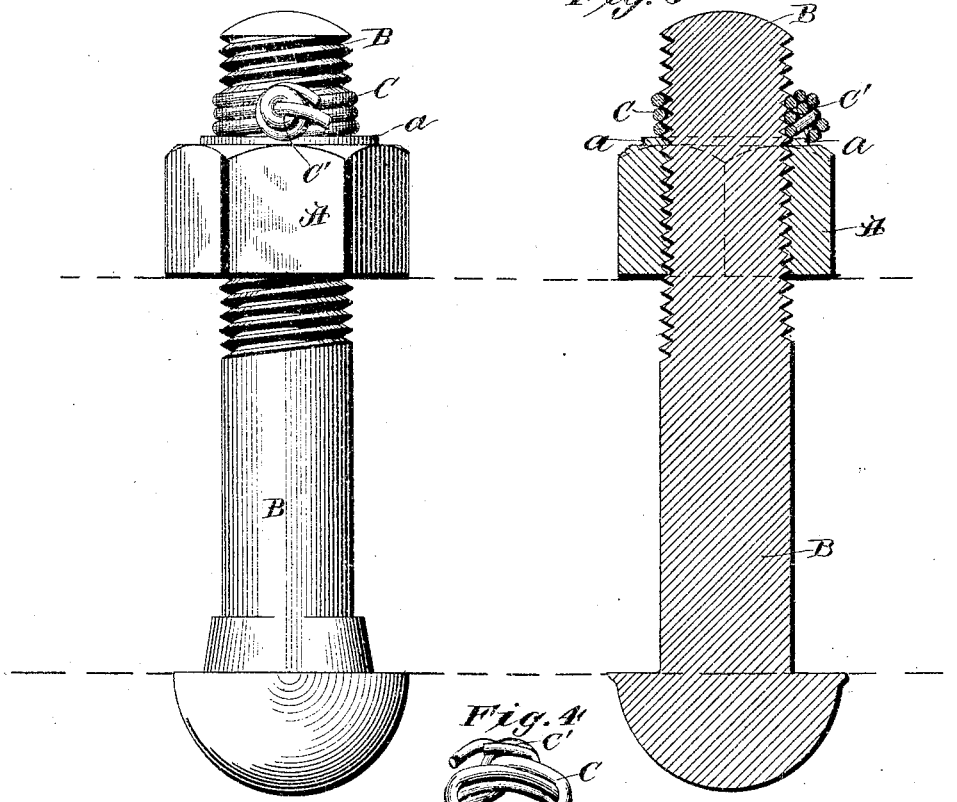
WITNESSES:
C. E. Duffy
Geo. S. Brock
INVENTOR
Miller Graffius
BY Munn & Co.
ATTORNEYS No. 778,030. Patented December 20, 1904.

UNITED STATES PATENT OFFICE.

MILLER GRAFFIUS, OF ALEXANDRIA, PENNSYLVANIA.

NUT-LOCK.

SPECIFICATION forming part of Letters Patent No. 778,030, dated December 20, 1904.

Application filed August 5, 1904. Serial No. 219,640.

*To all whom it may concern:*

Be it known that I, MILLER GRAFFIUS, a citizen of the United States, residing at Alexandria, in the county of Huntingdon and State of Pennsylvania, have invented a new and useful Improvement in Nut-Locks, of which the following is a specification.

My invention relates to an improvement in locking nuts on their bolts and preventing their accidental unlocking from any cause, its object being to provide a device which shall be simple, cheap, and efficient.

My invention consists in certain novel features of construction, arrangement, and combination of parts, as will be hereinafter fully described, and pointed out in the claims, reference being had to the accompanying drawings, in which—

Figure 1 is a perspective view of my device as applied. Fig. 2 is a side elevation of same. Fig. 3 is a central longitudinal section with the lock applied. Fig. 4 is a perspective view of the lock before being applied to a bolt and nut.

In carrying out my invention a nut and bolt are used, such parts being represented by A and B, respectively, the nut having an annular ridge $a$ surrounding the threaded opening.

C represents a piece of soft-metal wire, preferably copper, of the desired length. Said wire is formed into a spiral coil having, preferably, three or more convolutions. The upper and lower free ends of the coil are then brought together and twisted round each other, thereby drawing the convolutions of the coil closely together and forming a thread which will correspond in pitch to the threads on the bolt B. The twisted ends of the wire coil project outwardly beyond the cylindrical plane of the body of the coil and form a projection or finger-piece C', which will aid in screwing the coil upon the bolt.

In using my improved lock the nut is screwed upon the bolt as far as desired. The wire coil is then placed over the end of the bolt, and by means of the projection or finger-piece C' it is turned round on the bolt, whereupon it will travel along the bolt, by virtue of the convolutions thereof corresponding in pitch with the threads of the bolt, until it abuts the outer face of the nut and is stopped thereby. The outer edges of the finger-piece C', it will be observed, (see Fig. 3,) project beyond the plane of the upper and lower convolutions of the coil C, so that when the lock is screwed home against the nut these portions will extend below the plane of the upper face of the annular ridge $a$ and the lower convolution striking the ridge will cause its convolutions to bind upon the threads of the bolt and effectually lock the nut against further retrograde movement. Even should the finger-piece C' not project beyond the planes of the outer convolutions of the coil, as soon as the nut begins to bear against said convolutions a canting action will take place and cause the coil to bind against the threads of the bolt, because of the fact that said coil is made of soft or malleable metal wire. To remove the nut, all that is necessary is to unscrew the coil, which is readily done by using the finger-piece C' or using a wrench thereon. The nut can then be unscrewed in the usual manner.

Having thus described my invention, what I claim as new, and desire to secure by Letters Patent, is—

1. In a nut-lock, the combination with a nut and bolt, of a soft-metal wire coil consisting of a plurality of convolutions whose pitch corresponds to that of the threads of the bolt, the ends of said coil being twisted together and projecting beyond the cylindrical plane of the body of the coil.

2. In a nut-lock, the combination with a bolt and nut having an annular ridge around its threaded opening, of a soft-metal spiral spring consisting of a plurality of convolutions, whose pitch corresponds to that of the thread of the bolt, the end of said convolutions being twisted together and around each other to form a finger-piece, the outer edges of said finger-piece projecting beyond the outer convolutions of the coil.

3. As a new article of manufacture, a nut-lock consisting of a soft-metal spiral coil, the ends of said coil being twisted together and projecting beyond the cylindrical plane of the body of the coil.

4. As a new article of manufacture, a nut-lock consisting of a spiral coil, the ends of said coil being twisted together and projecting beyond the cylindrical plane of the body of the coil.

MILLER GRAFFIUS

Witnesses:
 H. J. McOteer,
 G. S. Housman.